United States Patent
Cleboski et al.

(10) Patent No.: US 10,422,186 B2
(45) Date of Patent: Sep. 24, 2019

(54) HARDFACING METAL PARTS

(71) Applicant: Halliburton Energy Services, Inc., Houston, TX (US)

(72) Inventors: Christopher Joseph Cleboski, Houston, TX (US); Kyle Patrick Vrnak, Houston, TX (US); Rajesh Handa, The Woodlands, TX (US); John Keller, Humble, TX (US); Grant O. Cook, III, Spring, TX (US); Douglas B. Caraway, Conroe, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 500 days.

(21) Appl. No.: 15/106,510

(22) PCT Filed: Jun. 25, 2015

(86) PCT No.: PCT/US2015/037717
§ 371 (c)(1),
(2) Date: Jun. 20, 2016

(87) PCT Pub. No.: WO2016/209238
PCT Pub. Date: Dec. 29, 2016

(65) Prior Publication Data
US 2018/0202233 A1    Jul. 19, 2018

(51) Int. Cl.
*E21B 10/46* (2006.01)
*E21B 10/573* (2006.01)
(Continued)

(52) U.S. Cl.
CPC .......... *E21B 10/5735* (2013.01); *E21B 10/00* (2013.01); *E21B 10/43* (2013.01);
(Continued)

(58) Field of Classification Search
CPC .. E21B 10/5735; E21B 17/1092; E21B 10/62; E21B 10/43; E21B 10/50; E21B 10/46; B23K 15/0046
See application file for complete search history.

(56) References Cited

U.S. PATENT DOCUMENTS

| 4,499,795 A * | 2/1985 | Radtke .................. B22D 19/06 164/108 |
| 5,379,854 A | 1/1995 | Dennis |

(Continued)

FOREIGN PATENT DOCUMENTS

EP    0989282 A2    3/2000

OTHER PUBLICATIONS

International Search Report and Written Opinion received in International Application No. PCT/US2015/037717, dated Mar. 10, 2016.

*Primary Examiner* — Rick K Chang
(74) *Attorney, Agent, or Firm* — Alan Bryson; C. Tumey Law Group PLLC

(57) ABSTRACT

A method includes positioning at least one guide projection on a substrate of a metal part such that the at least one guide projection extends outwardly from an outer surface of the substrate to an exposed length. Hardfacing is then applied to the substrate of the metal part at or near a location of the at least one guide projection. The exposed length of the at least one guide projection is then referenced in determining when to cease application of the hardfacing.

9 Claims, 4 Drawing Sheets

(51) Int. Cl.
    *E21B 10/00*     (2006.01)
    *E21B 10/43*     (2006.01)
    *E21B 10/50*     (2006.01)
    *E21B 10/62*     (2006.01)
    *E21B 17/10*     (2006.01)
    *B23K 15/00*     (2006.01)

(52) U.S. Cl.
    CPC .............. *E21B 10/46* (2013.01); *E21B 10/50* (2013.01); *E21B 10/62* (2013.01); *E21B 17/1092* (2013.01); *B23K 15/0046* (2013.01)

(56) References Cited

U.S. PATENT DOCUMENTS

| | | |
|---|---|---|
| 5,788,001 A | 8/1998 | Matthias et al. |
| 6,138,779 A | 10/2000 | Boyce |
| 6,615,936 B1 | 9/2003 | Mourik et al. |
| 6,651,756 B1 | 11/2003 | Costo, Jr. et al. |
| 7,621,347 B2 | 11/2009 | Overstreet |
| 8,056,652 B2 | 11/2011 | Lockwood et al. |
| 8,450,637 B2 | 5/2013 | Luce et al. |
| 8,471,182 B2 | 6/2013 | Stauffer et al. |
| 8,617,289 B2 | 12/2013 | Lockstedt et al. |
| 8,669,491 B2 | 3/2014 | Menon et al. |
| 8,698,038 B2 | 4/2014 | Luce et al. |
| 8,763,881 B2 | 7/2014 | Keshavan et al. |
| 2010/0159157 A1 | 6/2010 | Stevens et al. |
| 2010/0224414 A1 | 9/2010 | Radford et al. |
| 2010/0276200 A1 | 11/2010 | Schwefe |
| 2012/0067651 A1 | 3/2012 | Xia et al. |
| 2012/0193148 A1 | 8/2012 | Overstreet et al. |

\* cited by examiner

HARDFACING METAL PARTS

BACKGROUND

Since machining hard, abrasion, erosion and/or wear-resistant materials is generally both difficult and expensive, it is common practice to first form a metal part with a desired configuration and subsequently treat the metal part to provide desired abrasion, erosion and/or wear resistance. One example includes directly hardening desired surfaces of the metal part, such as by carburizing or nitriding such surfaces. Another example is applying a layer of hard, abrasion, erosion and/or wear-resistant material to desired surfaces of the metal part. This manufacturing process is commonly called hardfacing, which is generally defined as applying a layer or layers of hard, abrasion-resistant material to a less-resistant surface or substrate by plating, welding, spraying or other deposition techniques. The resulting material layer(s) of hard, abrasion, erosion and/or wear-resistant material is also commonly referred to as "hardfacing."

Hardfacing is frequently used to extend the service life of drill bits and other downhole tools used in the oil and gas industry. For instance, hardfacing drill bits helps mitigate abrasion and erosion to surfaces of the drill bit as the drill bit penetrates various subterranean formations during operation. Since hardfacing is typically applied by human operators or welders, the resulting hardfacing material is subject to error and is sometimes applied unevenly or over applied. Over-applied hardfacing on surfaces of a drill bit can result in blade rubbing, which can slow down or impede the rotational motion of the drill bit during drilling.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to manufacturing techniques and, more particularly, to improvements in applying hardfacing to metal parts or workpieces.

The embodiments disclosed herein will allow hardfacing technicians or operators to visibly gauge the height of hardfacing applied to the surface of a metal part of workpiece. To accomplish this, at least one guide projection is positioned on a substrate of a metal part such that the at least one guide projection extends outwardly from an outer surface thereof to an exposed length. In some cases, the guide projection may be inserted into a hole defined in the substrate, such as by press fitting or shrink fitting the guide projection into the hole. Hardfacing is then applied to the substrate of the metal part at or near the location of the at least one guide projection. The exposed length of the at least one guide projection is then referenced in determining when to cease application of the hardfacing. As will be appreciated, this may take away the guesswork in hardfacing applications, thereby resulting in hardfacing that is not over applied or inconsistent.

Figure 1:
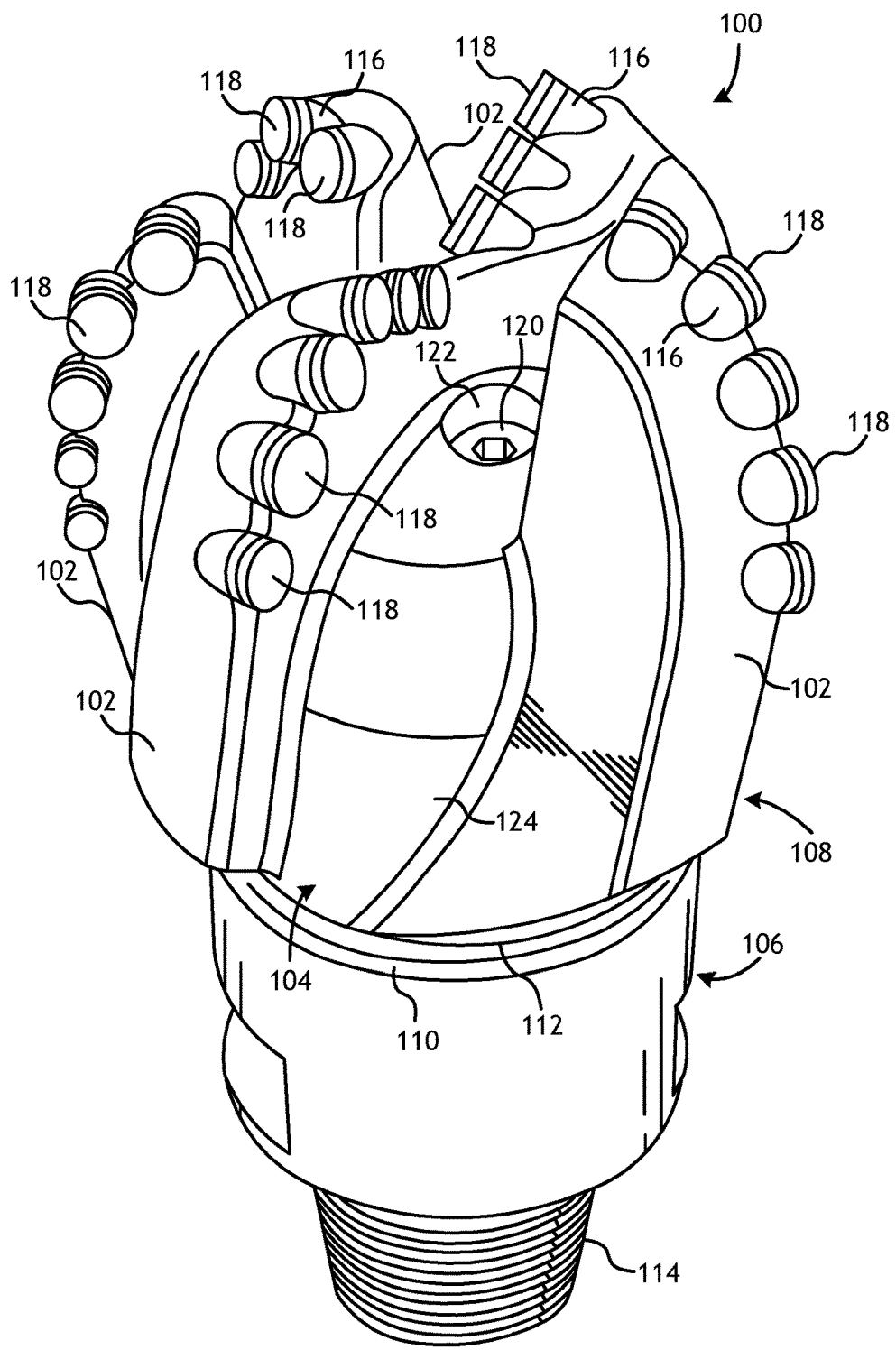
FIG. 1 is a perspective view of an example drill bit that may be hardfaced in accordance with the principles of the present disclosure.

Referring to FIG. 1, illustrated is a perspective view of an example drill bit 100 that may be hardfaced in accordance with the principles of the present disclosure. The drill bit 100 is generally depicted in FIG. 1 as a fixed-cutter drill bit that may be used in the oil and gas industry to drill wellbores. It should be noted, however, that the drill bit 100 may alternatively be replaced with any metal part or workpiece used in the oil and gas industry and that may otherwise benefit from hardfacing. Other metal parts or workpieces that may be hardfaced in accordance with the present disclosure include, for example, oilfield drill bits or cutting tools (e.g., fixed-angle drill bits, roller-cone drill bits, coring drill bits, bi-center drill bits, impregnated drill bits, reamers, stabilizers, hole openers, cutters), non-retrievable drilling components, aluminum drill bit bodies associated with casing drilling of wellbores, drill-string stabilizers, cones for roller-cone drill bits, models for forging dies used to fabricate support arms for roller-cone drill bits, arms for fixed reamers, arms for expandable reamers, internal components associated with expandable reamers, sleeves attached to an uphole end of a rotary drill bit, rotary steering tools, logging-while-drilling tools, measurement-while-drilling tools, sidewall coring tools, fishing spears, washover tools, rotors, stators and/or housings for downhole drilling motors, blades and housings for downhole turbines, and other downhole tools having complex configurations and/or asymmetric geometries associated with forming a wellbore.

It will be appreciated, however, that the principles of the present disclosure may equally apply to any other industry. More particularly, the hardfacing methods described herein may be applied to any metal part or workpiece that may require or benefit from hardfacing. Examples of other hardfaced metal parts or workpieces include earthmoving components, tractor parts, shovels, shovel or bucket teeth, transmission components, gears, shafts, railroad components, wheels, rails, couplings, mill components, dredging components, aerospace components, and repair of broken or worn components that experience significant abrasion, erosion, or wear.

As illustrated in FIG. 1, the drill bit 100 may include or otherwise define a plurality of blades 102 arranged along the circumference of a bit head 104. The bit head 104 is connected to a shank 106 to form a bit body 108. The bit body 108 may be made of steel and, therefore, the drill bit 100 may be referred to as a "steel-body drill bit." The shank 106 may be connected to the bit head 104 by welding, which results in the formation of a weld 110 around a weld groove 112. The shank 106 may further include or otherwise be connected to a threaded pin 114, such as an American Petroleum Institute (API) drill pipe thread, to be connected to a drill string for downhole drilling use.

In the depicted example, the drill bit 100 includes five blades 102 in which multiple recesses or pockets 116 are formed. A cutting element 118, also commonly referred to as a "cutter," may be secured within each pocket 116. This can be done, for example, by brazing each cutting element 118 into a corresponding pocket 116. As the drill bit 100 is rotated in use, the cutting elements 118 engage the rock and underlying earthen materials, to dig, scrape or grind away the material of the formation being penetrated.

During drilling operations, drilling fluid or "mud" can be pumped downhole through a drill string (not shown) coupled to the drill bit 100 at the threaded pin 114. The drilling fluid circulates through and out of the drill bit 100 at one or more nozzles 120 positioned in nozzle openings 122 defined in the bit head 104. Junk slots 124 are formed between each adjacent pair of blades 102. Cuttings, downhole debris, formation fluids, drilling fluid, etc., may pass through the junk slots 124 and circulate back to the well surface within an annulus formed between exterior portions of the drill string and the inner wall of the wellbore being drilled.

Steel-body drill bits, such as the drill bit 100, exhibit much more erosive and abrasive wear as compared to matrix drill bits, which are manufactured by infiltration of a molten metal into a reinforcement material comprising tungsten carbide, for example, or another powdered reinforcement material. Steel-body drill bits tend to exhibit superior toughness but limited erosion and abrasion resistance, whereas matrix drill bits tend to exhibit reduced toughness but exemplary erosion and abrasion resistance. According to embodiments of the present disclosure, desired portions or surfaces of the drill bit 100 may be hardfaced to increase the abrasion, erosion, and/or corrosion resistance of such surfaces.

The hardfacing can be applied to the desired parts/surfaces of the drill bit 100, or any other metal part or workpiece, via a variety of hardfacing techniques. Suitable hardfacing techniques include, but are not limited to, oxyacetylene welding (OXY), atomic hydrogen welding (ATW), welding via tungsten inert gas (TIG), gas tungsten arc welding (GTAW), shielded metal arc welding (SMAW), gas metal arc welding (GMAW—including both gas-shielded and open arc welding), oxyfuel welding (OFW), submerged arc welding (SAW), electroslag welding (ESW), plasma transferred arc welding (PTAW—also called powder plasma welding), additive/subtractive manufacturing, thermal spraying, cold polymer compounds, laser cladding, hardpaint, and any combination thereof.

A wide variety of hardfacing materials may be used to hardface the drill bit 100, or any other metal part or workpiece. One suitable hardfacing material is sintered tungsten carbide particles in a steel alloy matrix. The tungsten carbide particles may include grains of monotungsten carbide, ditungsten carbide and/or macrocrystalline tungsten carbide. Spherical cast tungsten carbide may typically be formed with no binding material. Examples of binding materials used to form tungsten carbide particles may include, but are not limited to, cobalt, nickel, boron, molybdenum, niobium, chromium, iron and alloys of these elements. Other hard constituent materials include cast or sintered carbides consisting of chromium, molybdenum, niobium, tantalum, titanium, vanadium and alloys and mixtures thereof.

The hardfacing material may be captured within a mild steel tube and then used as a welding rod to deposit hardfacing onto the desired metal part or workpiece, usually with a deoxidizer, or flux. This technique of applying hardfacing is sometimes referred to as "tube-rod welding."

Figure 2:
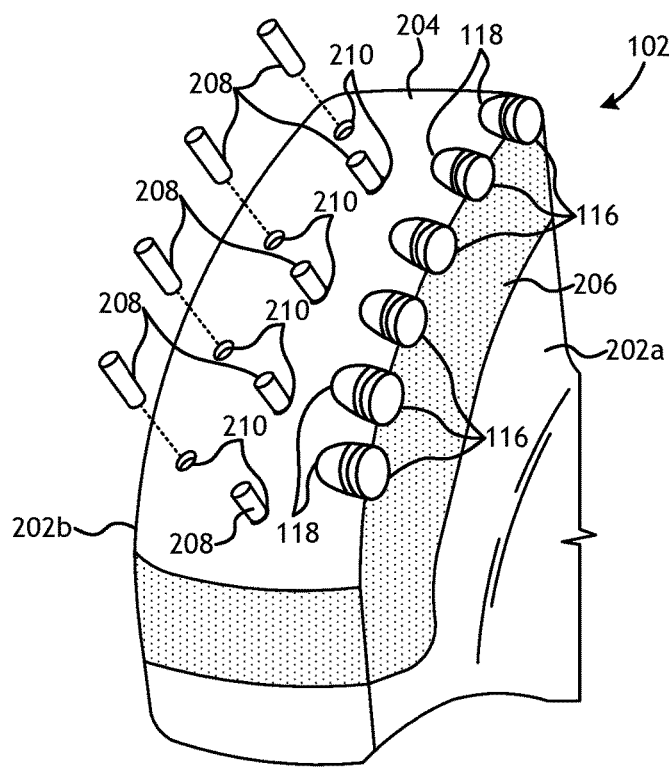
FIG. 2 depicts an enlarged portion of the drill bit of FIG. 1.

Referring to FIG. 2, illustrated is an enlarged portion of the drill bit 100 and, more particularly, a blade 102 that may be hardfaced according to the methods of the present disclosure. As illustrated, the blade 102 includes a leading face 202a, a back face 202b, and a top blade surface 204 that extends between the leading and back faces 202a,b. A plurality of cutting elements 118 are also depicted as secured within corresponding pockets 116 defined on the blade 102.

Any of the surfaces of the blade 102, including the leading and back faces 202a,b and the top blade surface 204, may be hardfaced and otherwise constitute a suitable substrate for applying a hardfacing material according to the present disclosure. In the illustrated embodiment, a hardfacing material 206 has already been applied on the leading face 202a and the back face 202b (not shown). According to the present disclosure, one or more guide projections 208 may be used to help apply hardfacing material to the top blade surface 204. In other embodiments, the guide projections 208 may also be used to help apply the hardfacing material 206 to the leading face 202a and/or the back face 202b, without departing from the scope of the present disclosure.

As illustrated, the guide projections 208 may be positioned on and extend orthogonally from the outer surface of the substrate of a metal part or workpiece to be hardfaced; i.e., the top blade surface 204 of the blade 102. The guide projections 208 may help an operator apply hardfacing material more evenly, consistently, and precisely across the outer surface of the metal part or workpiece. In some embodiments, one or more of the guide projections 208 may be cast or molded as an integral part and/or extension of the outer surface of the substrate to be hardfaced. In other embodiments, one or more of the guide projections 208 may be machined into the outer surface of the substrate to be hardfaced and thereby also form an integral part and/or extension of the metal part or workpiece. In other embodiments, one or more of the guide projections 208 may be mechanically affixed to or held in place on the outer surface of the substrate to be hardfaced such as by welding, brazing, or using an adhesive. In any of the foregoing embodiments, the guide projections 208 may be sized such that a predetermined length of each guide projection 208 may extend from the outer surface of the substrate to be used as a depth gauge for the desired thickness of the hardfacing material to be applied to the metal part or workpiece.

In yet other embodiments, as illustrated, a plurality of holes 210 may be defined or otherwise provided in the substrate and each guide projection 208 may be inserted into a corresponding hole 210. The length of each guide projection 208 and the depth of each hole 210 may allow a predetermined length of the guide projection 208 to protrude from the hole 210 and thereby be used as a depth gauge for the desired thickness of the hardfacing material to be applied to the metal part or workpiece. Accordingly, as used herein, positioning the guide projections 208 on the substrate includes affixing the guide projections 208 directly to the outer surface of the substrate, forming or machining the guide projections 208 as an integral part of the substrate, and/or receiving the guide projections 208 into corresponding holes 210. In any scenario, a predetermined length of the guide projection 208 will extend from the outer surface of the substrate whether or not the guide projection 208 is seated within a corresponding hole 210.

The guide projections 208 may be received within the holes 210 via a variety of ways. In some embodiments, for instance, one or more of the guide projections 208 may be loosely received into the corresponding holes 210. In other embodiments, one or more of the guide projections 208 may be press fit or shrink fitted into the corresponding holes 210 such that an interference fit between the two components is generated. In yet other embodiments, one or more of the guide projections 208 may be threaded, brazed, or welded into the corresponding holes 210.

Once the guide projections 208 are properly received within the corresponding holes 210, the hardfacing operation or process may commence. As indicated above, the guide projections 208 protruding out of the holes 210 may help an operator to visibly determine the correct depth or thickness of the hardfacing material to be applied to the metal part or workpiece (e.g., the top blade surface 204). Once the hardfacing material is built up to and otherwise reaches the height of the exposed portions of the guide projections 208, the operator may cease application of the harfacing material at that location and be assured that the thickness of the hardfacing is generally consistent and not over applied.

In the illustrated embodiment, eight guide projections 208 and eight corresponding holes 210 are depicted, with four guide projections 208 received within four corresponding holes 210 and four guide projections 208 shown in an exploded view away from the four corresponding holes 210. It will be appreciated, however, that more or less than eight guide projections 208 and corresponding holes 210 may be employed on any given metal part or workpiece, without departing from the scope of the disclosure. Moreover, the guide projections 208 and corresponding holes 210 are depicted in FIG. 2 as being generally staggered on the top blade surface 204 in two columns, but may alternatively be arranged in any desired pattern or arrangement. Indeed, the pattern of the guide projections 208 and corresponding holes 210 may be dependent on the dimensions and configurations of the specific metal part or workpiece to receive the hardfacing.

Figure 3A:
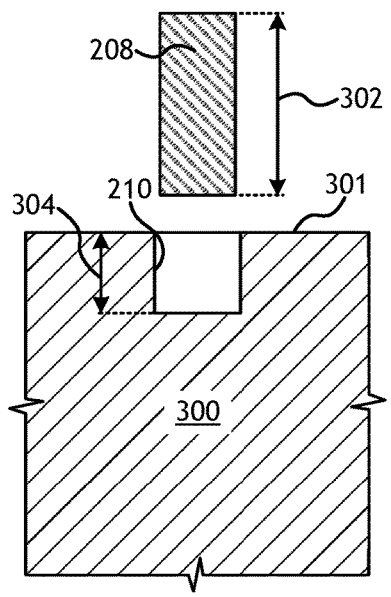
FIGS. 3A and 3B are cross-sectional side views of an exemplary substrate that may be hardfaced according to the methods of the present disclosure.
Figure 3B:
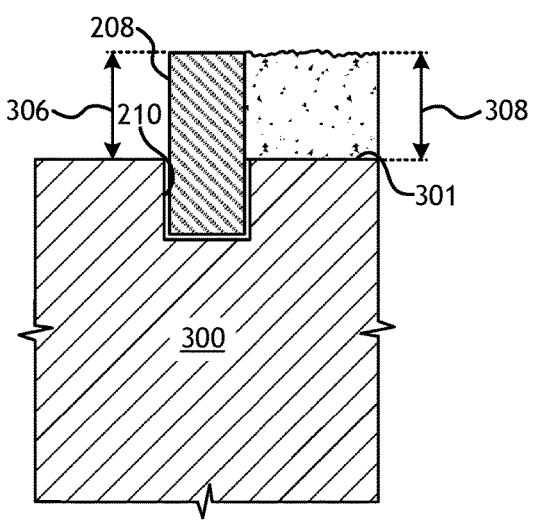

Referring now to FIGS. 3A and 3B, illustrated are cross-sectional side views of an exemplary substrate 300 that may be hardfaced according to the methods of the present disclosure. The substrate 300 may comprise any metal part or workpiece desired to be hardfaced. In at least one embodiment, the substrate 300 may be the top blade surface 204 of the blade 102 shown in FIG. 2. FIG. 3A depicts an exploded view of the substrate 300 and an associated guide projection 208, and FIG. 3B depicts the guide projection 208 received within a hole 210 defined or otherwise provided in a surface 301 of the substrate 300.

The hole 210 may be sized and otherwise configured to receive the guide projection 208. In some embodiments, for instance, the guide projection 208 may exhibit a circular cross-sectional shape and the hole 210 may correspondingly be circular in shape. In other embodiments, however, guide projection 208 may be polygonal (e.g., triangular, square, etc.), and the hole 210 may exhibit a corresponding polygonal shape to receive the polygonal guide projection 208. In yet other embodiments, the respective shapes of the guide projection 208 and the hole 210 may be different, but the hole 210 may nonetheless be sized to receive the guide projection 208. It will be appreciated that the shape of the guide projection(s) 208 is not intended to be limited to circular or polygonal, as mentioned above, but may exhibit any conceivable shape, without departing from the scope of the disclosure.

The guide projection 208 may be made of a variety of materials including, but not limited to, steel, a steel alloy, a carbide (e.g., tungsten carbides, spherical carbides, cast carbides, silicon carbides, boron carbides, cubic boron carbides, molybdenum carbides, chromium carbides, vanadium carbides, iron carbides, macrocrystalline tungsten carbides, cast tungsten carbides, crushed sintered tungsten carbides, carburized tungsten carbides, etc.), a cemented carbide (titanium carbide, tantalum carbide, niobium carbide, etc.), a boride, an oxide, a nitride, a silicide, a metal-matrix composite, a refractory metal, such as tungsten, molybdenum, niobium, tantalum, rhenium, titanium, vanadium, chromium, zirconium, ruthenium, rhodium, hafnium, osmium, iridium, any combination thereof, any alloy thereof, and any combination thereof.

As illustrated, the guide projection 208 may exhibit a length 302 and the hole 210 may exhibit a depth 304 extending into the substrate 300 from the surface 301. The depth 304 of the hole 210 may be determined such that when the guide projection 208 is received within the hole 210, the portion of the guide projection 208 that protrudes out of the hole 210 may exhibit an exposed length 306. The exposed length 306 may correspond to a desired depth or thickness 308 for a hardfacing material 310 to be applied to the surface 301 of the substrate 300 and refers to the length that the guide projection 208 extends from the outer surface of the substrate, whether or not the guide projection 208 is seated within a corresponding hole 210. Accordingly, once the guide projection 208 is properly received within the hole 210, the operator may proceed to apply the hardfacing material 310 to the surface 301 of the substrate 300. Once the hardfacing material 310 is built up and otherwise reaches the exposed length 306 of the guide projection 208, the operator may cease applying the hardfacing material 310 and be assured that the hardfacing material 310 is applied to the desired thickness 308 and otherwise not over applied.

In an example embodiment, the length 302 of the guide projection 208 may be 0.250 inches long, and the depth 304 of the hole 210 may be 0.125 inches deep. As a result, when the guide projection 208 is received within the hole 210, the exposed length 306 is 0.125 inches, which may allow an operator to visibly gauge the desired thickness 308 of the hardfacing material 310 to 0.125 inches as applied to the surface 301 of the substrate 300. It will be appreciated that the dimensions of the guide projection 208 and the hole 210 may vary depending on the application and, more particularly, depending on the desired thickness 308 of the hardfacing material 310 to be applied.

In some embodiments, the guide projection 208 may be loosely received within the hole 210 and otherwise able to be removed before finishing the hardfacing application. In such embodiments, the operator may build up the hardfacing material 310 to the exposed length 306 of the guide projection 208 and, upon reaching the height of the exposed length 306, the guide projection 208 may be removed from the hole 210. Once the guide projection 208 is removed, the operator may then proceed to deposit hardfacing material 310 into the hole 210.

In other embodiments, however, the hardfacing material 310 may be applied around the guide projection 208 and thereby effectively secure the guide projection 208 to the substrate 300. This may prove advantageous in embodiments where the substrate 300 is a surface of a drill bit that may need repair or rehabilitation following drilling operations. In such embodiments, the substrate 300 may comprise the top blade surface 204 of the blade 102 of FIGS. 1 and 2 (or any other surface where the hardfacing material 310 is applied), and the drill bit 100 (FIG. 1) may require repair and/or rehabilitation after drilling a portion of a wellbore. For instance, drilling operations can result in the erosion of the hardfacing material 310 and, simultaneously, erosion and damage to the guide projection 208. In repairing/rehabilitating the drill bit 100, the guide projection 208 may be extracted from the hole 210, such as by drilling the guide projection 208 out or otherwise grinding the surrounding hardfacing material 310 until the guide projection 208 can be removed. In at least one embodiment, the guide projection 208 may be removed via electric discharge machining or similar technology. Once the guide projection 208 is removed, a new guide projection that exhibits the length 302 may be inserted into the hole 210 and the hardfacing material 310 may again be built up to the exposed length 306.

FIGS. 4A-4F are cross-sectional side views of exemplary guide projections 208, in accordance with the principles of the present disclosure. The guide projections 208 in FIGS. 4A-4F are each depicted as being inserted into a hole 210 defined in the substrate 300, but could alternatively be attached to or otherwise extend from the outer surface 301 of the substrate 300, without departing from the scope of the disclosure. In the illustrated embodiments, the guide projection 208 are shown to exhibit various geometries other than the exemplary cylinder to provide certain benefits.

Figure 4A:
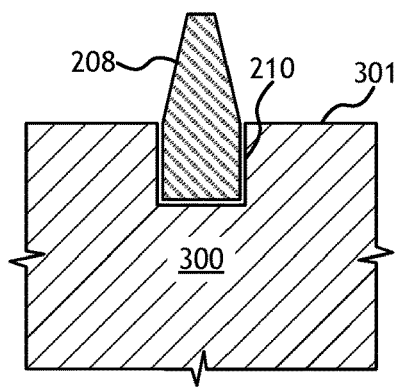
FIGS. 4A-4F are cross-sectional side views of exemplary guide projections.
Figure 4B:
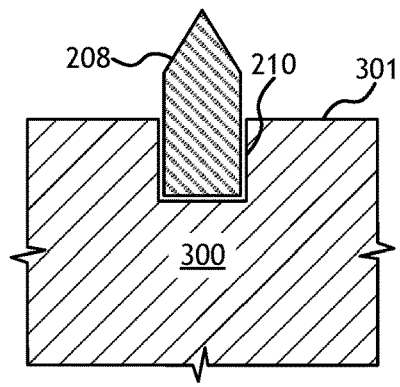

For example, the guide projection 208 in FIG. 4A may comprise one or more pieces that take the form of a truncated cone on top of a cylindrical base. In the depicted embodiment, the height of the cylindrical base is shown to be equal to the depth 304 (FIG. 3A) of the hole 210 and the height of the truncated cylinder is shown to be equal to the desired depth or thickness 308 (FIG. 3B), though other heights and/or lengths may be used. FIG. 4B illustrates a guide projection 208 that is similar to a complete cone on top of a taller cylindrical base, wherein the cylindrical portion extends above the depth 304 of the hole 210. These and similar embodiments may provide benefit by minimizing the exposed surface area of the material of the guide projection 208 after application of the hardfacing material 310 (FIG. 3B). This may be particularly advantageous in highly erosive and/or abrasive applications.

Figure 4C:
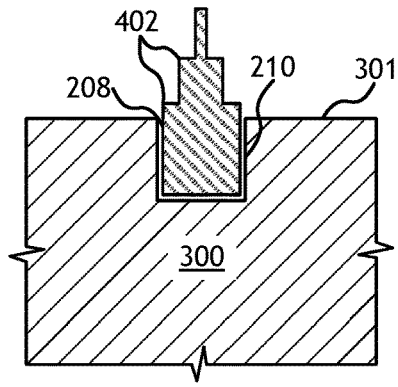

As shown in FIG. 4C, the guide projection 208 may resemble stacked cylinders of decreasing diameter. Such a configuration may be desirable by minimizing exposed surface area of the guide projection 208 after hardfacing application while also providing intermediate guide heights 402 (two shown). These intermediate guide heights 402 may be used for applying hardfacing in multiple layers of consistent thickness across the outer surface 302 of the substrate 300 (e.g., the top blade surface 204). Alternatively, the intermediate guide heights 402 may be used by an operator to gauge the length of time required for application of a given hardfacing material to the desired depth or thickness 308 (FIG. 3B) based on the given hardfacing material, substrate material, and other process variables. In such embodiments, the intermediate guide heights 402 may be characterized as timing guides, and such timing guides may assist the operator in achieving more even and consistent application of hardfacing across the outer surface 302 of the substrate 300 (e.g., the top blade surface 204) and between guide projections 208.

Figure 4D:
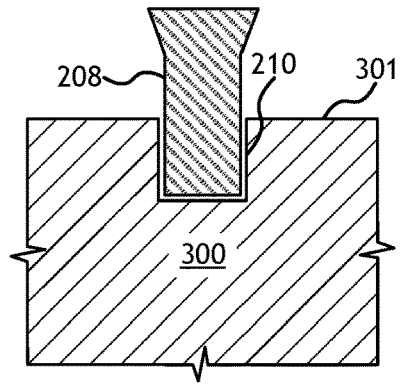
Figure 4E:
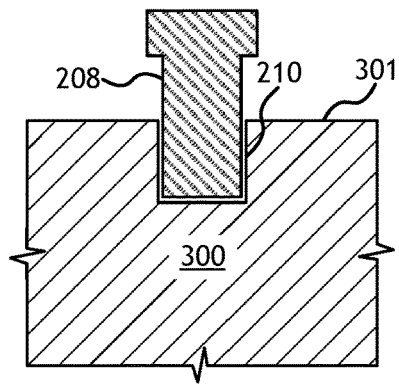

FIGS. 4D and 4E depict the guide projection 208 as resembling a bolt with a tapered (FIG. 4D) or flat (FIG. 4E) head. The use of the guide projection 208 with additional material located at the desired depth or thickness 308 (FIG. 3B) may help to retain the applied hardfacing material during operation of the metal part or workpiece (e.g., the drill bit of FIG. 1). An exemplary material for such a guide projection 208 may be a cemented carbide material, such that the guide projection 208 enhances or maintains the erosion or abrasion resistance of the hardfaced surface.

Figure 4F:
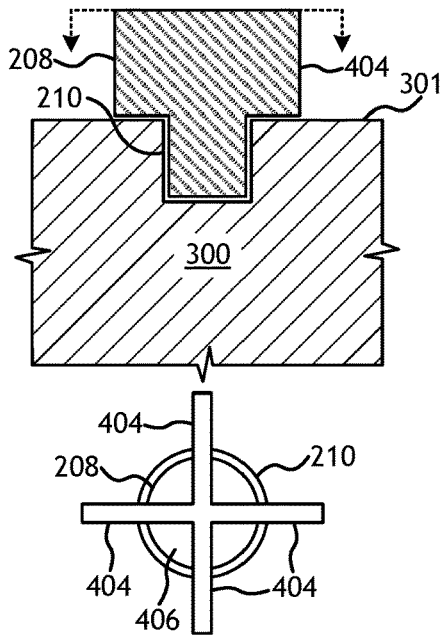

In FIG. 4F, the guide projection 208 may include multiple fins 404 extending from a base 406. As shown in the top view below the cross-sectional side view, the guide projection 208 includes four fins 404 that are angularly spaced from each other by 90° and attached to a cylindrical base 406. While four fins 404 are depicted, it will be appreciated that the guide projection 208 may include more or less than four fins 404, and the base 406 may exhibit other cross-sectional shapes besides cylindrical, without departing from the scope of the disclosure. The guide projection 208 of FIG. 4F may be machined or otherwise formed out of a single piece of material or the fins 404 may be secured to the base 406 via a suitable bond or other attachment method (e.g., welding, brazing, adhesives, mechanical fasteners, etc.). Such a guide projection 208 may be desirable as it minimizes exposed surface area of the material of the guide projection 208 while also guiding the desired depth or thickness 308 (FIG. 3B) over a broader surface area.

Figure 5:
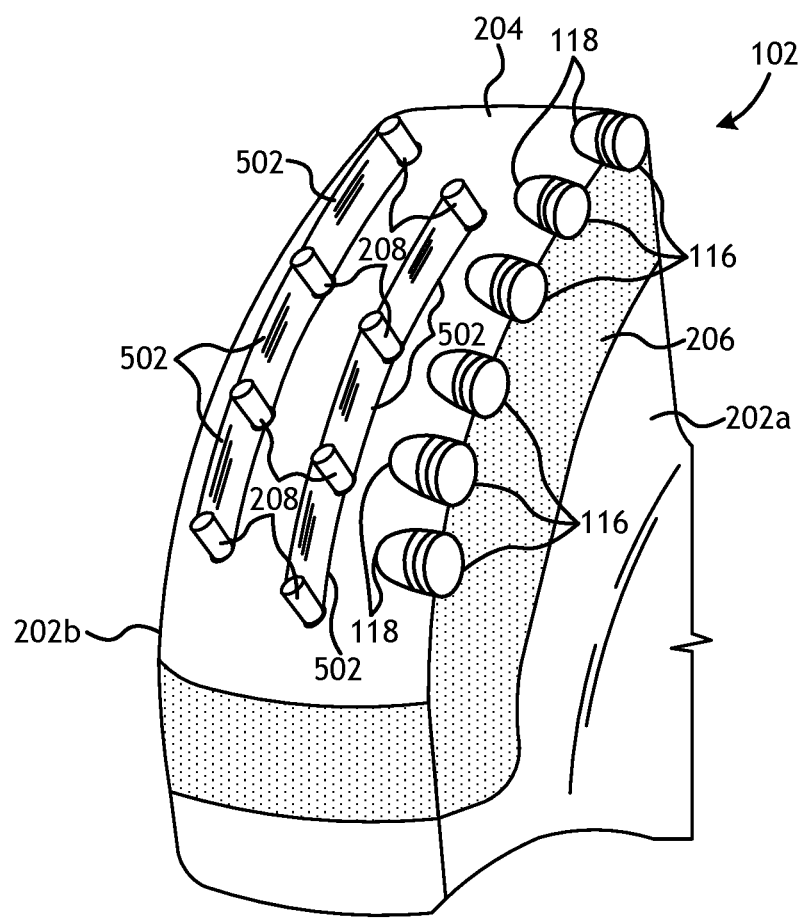
FIG. 5 depicts an enlarged portion of the drill bit of FIG. 1.

FIG. 5 is an enlarged portion of the drill bit 100 of FIG. 1 and, more particularly, one of the blades 102 that may be hardfaced according to the methods of the present disclosure. Similar reference numerals used in prior figures refer to similar components or elements that may not be described again in detail. It will be appreciated, however, that the blade 102 may be replaced with any metal part or workpiece that may be hardfaced. In the illustrated embodiment, connecting members 502 may be bonded, attached, or otherwise secured to adjacent guide projections 208 to provide guidance for the desired depth or thickness 308 (FIG. 3B) over a broader area of the top blade surface 204. The connecting members 502 may include, for example, a foil, a sheet, a wire, or any combination thereof. As illustrated, the connecting members 502 may be configured in rows or columns. Alternatively, the connecting members 502 may be placed between more or fewer guide projections 208 to create other connecting member 502 configurations, such as a hexagonal grid, a square grid, a triangular grid, and the like. Additionally, the connecting members 502 may be placed between alternating guide projections 208, thereby producing an alternating grid, without departing from the scope of the disclosure.

Furthermore, similar to the connecting members 502 embodiment, a mesh material (not expressly shown) may be attached, bonded, or otherwise secured to the tops of one or more of the guide projections 208 to provide more even guidance for the desired depth or thickness 308 (FIG. 3B) over a broader area of the top blade surface 204.

Embodiments disclosed herein include:

A. A method that includes positioning at least one guide projection on a substrate of a metal part such that the at least one guide projection extends outwardly from an outer surface of the substrate to an exposed length, applying hardfacing to the substrate of the metal part at or near a location of the at least one guide projection, and referencing the exposed length of the at least one guide projection in determining when to cease application of the hardfacing.

B. A method that includes introducing a drill bit into a wellbore, the drill bit having hardfacing applied to a substrate thereof, wherein the hardfacing is applied as follows positioning at least one guide projection on the substrate such that the at least one guide projection extends outwardly from an outer surface of the substrate to an exposed length, applying hardfacing to the substrate at or near a location of the at least one guide projection, and referencing the exposed length of the at least one guide projection in determining when to cease application of the hardfacing. The method further including drilling a portion of the wellbore by rotating the drill bit.

Each of embodiments A and B may have one or more of the following additional elements in any combination: Element 1: wherein positioning the at least one guide projection on the substrate comprises inserting the at least one guide projection into a hole defined in the substrate. Element 2:

wherein inserting the at least one guide projection into the hole comprises press fitting or shrink fitting the at least one guide projection into the hole. Element 3: wherein inserting the at least one guide projection into the hole comprises threading, adhesively bonding, brazing, or welding the at least one guide projection into the hole. Element 4: wherein positioning at least one guide projection on the substrate comprises casting or molding the at least one guide projection as an integral component of the metal part. Element 5: wherein the at least one guide projection comprises a material selected from the group consisting of steel, a steel alloy, a carbide, a cemented carbide, a boride, an oxide, a nitride, a silicide, a metal-matrix composite, a refractory metal, any combination thereof, and any alloy thereof. Element 6: further comprising ceasing application of the hardfacing when a thickness of the hardfacing reaches the exposed length of the at least one guide projection. Element 7: wherein the at least one guide projection has a geometry selected from the group consisting of cylindrical, a truncated cone on top of a cylindrical base, a cone extending from a cylindrical base, two or more stacked cylinders of decreasing diameter, a bolt with a tapered or flat head, multiple fins extending from a base, and any combination thereof. Element 8: further comprising positioning a connecting member between the at least one guide projection and an adjacent guide projection on the substrate. Element 9: further comprising loosely receiving the at least one guide projection into a hole defined in the substrate, removing the at least one guide projection prior to finishing application of the hardfacing, and applying the hardfacing to the hole. Element 10: wherein applying the hardfacing to the substrate comprises undertaking at least one of oxyacetylene welding (OXY), atomic hydrogen welding (ATW), welding via tungsten inert gas (TIG), gas tungsten arc welding (GTAW), shielded metal arc welding (SMAW), gas metal arc welding (GMAW), oxyfuel welding (OFW), submerged arc welding (SAW), electroslag welding (ESW), plasma transferred arc welding (PTAW), additive/subtractive manufacturing, thermal spraying, cold polymer compounds, laser cladding, hardpaint, and any combination thereof.

Element 11: wherein the substrate of the drill bit comprises at least one of a leading face, a back face, and a top blade surface of a blade that extends from a bit body of the drill bit. Element 12: wherein the at least one guide projection comprises a material selected from the group consisting of steel, a steel alloy, a carbide, a cemented carbide, a boride, an oxide, a nitride, a silicide, a metal-matrix composite, a refractory metal, any combination thereof, and any alloy thereof. Element 13: further comprising ceasing application of the hardfacing when a thickness of the hardfacing reaches the exposed length of the at least one guide projection. Element 14: further comprising loosely receiving the at least one guide projection into a hole defined in the substrate, removing the at least one guide projection prior to finishing application of the hardfacing, and applying the hardfacing to the hole. Element 15: wherein positioning the at least one guide projection on the substrate comprises inserting the at least one guide projection into a hole defined in the substrate. Element 16: further comprising retracting the drill bit out of the wellbore, removing the at least one guide projection from the hole, positioning a new guide projection in the hole such that the new guide projection extends outwardly from the outer surface of the substrate to the exposed length, applying new hardfacing to the substrate at or near a location of the new guide projection, and referencing the exposed length of the new guide projection in determining when to cease application of the new hardfacing. Element 17: wherein removing the at least one guide projection from the hole comprises drilling the at least one guide projection out of the hole. Element 18: wherein removing the at least one guide projection from the hole comprises grinding the hardfacing surrounding the at least one guide projection to expose the at least one guide projection, and extracting the at least one guide projection once exposed. Element 19: wherein removing the at least one guide projection from the hole comprises extracting or removing the at least one guide projection using electric discharge machining.

By way of non-limiting example, exemplary combinations applicable to A and B include: Element 1 with Element 2; Element 1 with Element 3; Element 15 with Element 16; Element 16 with Element 17; Element 16 with Element 18; and Element 16 with Element 19.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A method, comprising:
   forming a drill bit that includes a steel body and one or more blades;
   applying a hardfacing to the drill bit, wherein the hardfacing is applied as follows:
   positioning at least one guide projection on the drill bit such that the at least one guide projection extends outwardly from an outer surface of the drill bit to an exposed length; and
   applying hardfacing to the drill bit at or near a location of the at least one guide projection until at least a portion of the exposed length is occluded with the hardfacing.

2. The method of claim 1, wherein the drill bit further includes at least one of a leading face, a back face, and a top blade surface of a blade that extends from the drill bit.

3. The method of claim 1, wherein the at least one guide projection comprises a material selected from the group consisting of steel, a steel alloy, a carbide, a cemented carbide, a boride, an oxide, a nitride, a silicide, a metal-matrix composite, a refractory metal, any combination thereof, and any alloy thereof.

4. The method of claim 1, further comprising
   ceasing application of the hardfacing when a thickness of the hardfacing reaches the exposed length of the at least one guide projection.

5. The method of claim 1, further comprising:
   loosely receiving the at least one guide projection into a hole defined in a substrate;
   removing the at least one guide projection prior to finishing application of the hardfacing; and
   applying the hardfacing to the hole.

6. The method of claim 1, wherein positioning the at least one guide projection on the substrate comprises inserting the at least one guide projection into a hole defined in a substrate.

7. The method of claim 6, further comprising:
   retracting the drill bit out of a wellbore; removing the at least one guide projection from the hole;
   positioning a new guide projection in the hole such that the new guide projection extends outwardly from the outer surface of the substrate to the exposed length;
   applying new hardfacing to the substrate at or near a location of the new guide projection; and
   referencing the exposed length of the new guide projection in determining when to cease application of the new hardfacing.

8. The method of claim 7, wherein removing the at least one guide projection from the hole comprises drilling the at least one guide projection out of the hole.

9. The method of claim 7, wherein removing the at least one guide projection from the hole comprises: grinding the hardfacing surrounding the at least one guide projection to expose the at least one guide projection; and extracting the at least one guide projection once exposed.

* * * * *